United States Patent [19]

Gemignani

[11] 4,291,721
[45] Sep. 29, 1981

[54] APPARATUS FOR PRESSURE DETECTION AND CONTROL OF A SAFETY VALVE

[76] Inventor: Francois Gemignani, 14, Lotissement du Pati, Martigues, (Bouches-du-Rhone), France

[21] Appl. No.: 22,159

[22] Filed: Mar. 20, 1979

[30] Foreign Application Priority Data

Mar. 21, 1978 [FR] France .................................. 78 08835

[51] Int. Cl.$^3$ ............................................. F16K 31/12
[52] U.S. Cl. .................................. 137/492; 137/596.18
[58] Field of Search ...................... 137/488, 492, 492.5, 137/596.18, 627.5

[56] References Cited

U.S. PATENT DOCUMENTS

| | | | |
|---|---|---|---|
| 1,110,320 | 9/1914 | Fulton | 137/492.5 UX |
| 2,113,943 | 4/1938 | Kimball | 137/492.5 |
| 2,185,671 | 1/1940 | Kimball | 137/492.5 |
| 2,977,110 | 3/1961 | Kilgore | 137/627.5 X |
| 3,754,566 | 8/1973 | Gemignani | 137/488 |

*Primary Examiner*—Alan Cohan
*Attorney, Agent, or Firm*—Karl F. Ross

[57] ABSTRACT

A safety valve for a pressure vessel, e.g. a marine boiler, comprises a piston-operated valve mounted on the pressure vessel and provided with a cylinder which is connected to a pressure detector. According to the invention, a pair of juxtaposed control valves are provided for selectively opening and blocking communication between the cylinder and the pressure vessel and between the cylinder and the atmosphere, respectively, these control valves being actuated by an element disposed between them and connected by a rod to a control piston which is displaced by the pressure in the vessel against the force of an adjustable spring.

5 Claims, 6 Drawing Figures

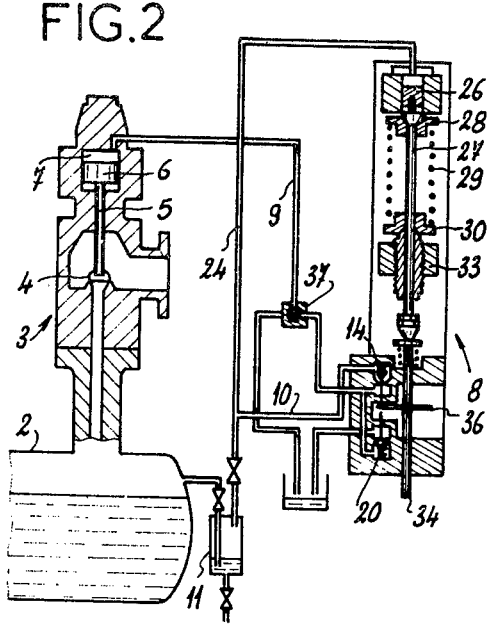
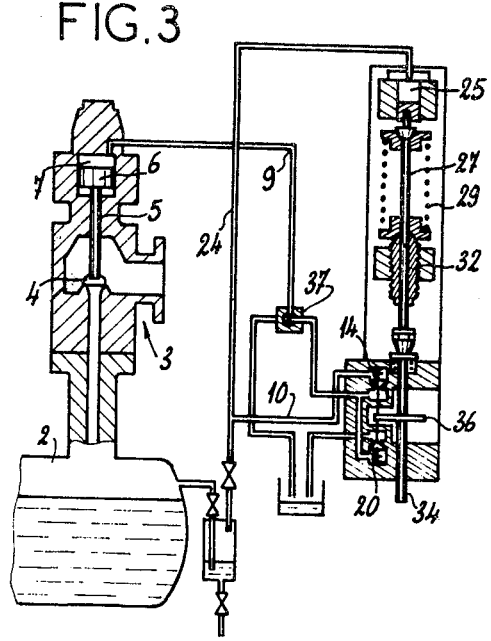
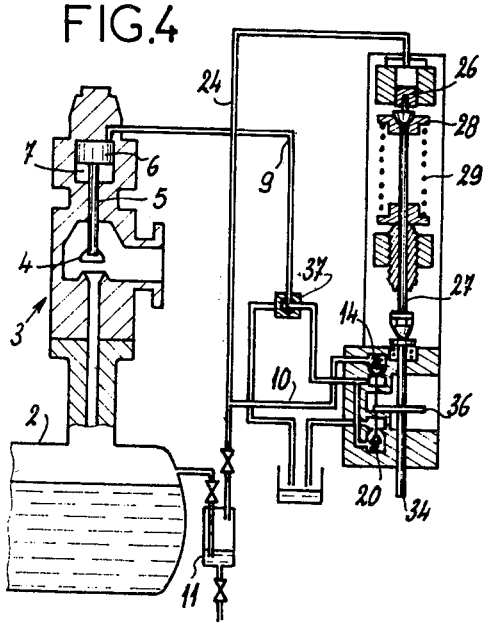
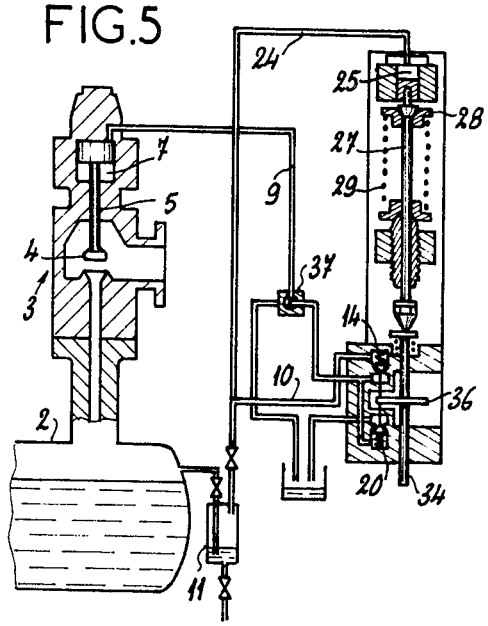

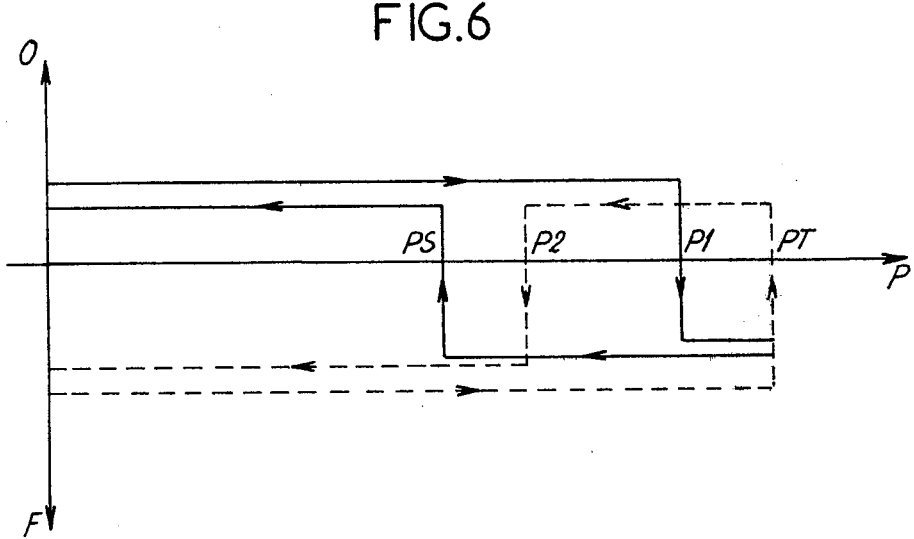

APPARATUS FOR PRESSURE DETECTION AND CONTROL OF A SAFETY VALVE

CROSSREFERENCE TO RELATED APPLICATIONS

The present application is related to my copending application Ser. No. 789,229 filed Apr. 20, 1977, (now U.S. Pat. No. 4,200,116, issued Apr. 29, 1980 and to my earlier application on similar subject matter which has since issued as U.S. Pat. No. 3,754,566.

FIELD OF THE INVENTION

The present invention relates to safety valves for pressure vessels and, more particularly, to improvements in pressure detection and the control of a safety valve for such pressure vessels.

BACKGROUND OF THE INVENTION

It is common practice to equip apparatus such as a pressure vessel, especially a boiler and particularly a marine-propulsion boiler, with a safety valve or pressure relief valve which is adapted to vent the vessel when the pressure therein exceeds a predetermined limit. In other words, vessels which are to be maintained under pressure can commonly provided with pressure-relief valves intended to avoid over-pressurization of the vessel and danger to operating personnel and to the structure.

The earliest and most rudimentary systems of this type provide the safety valve with a valve member which is urged against the seat by a spring of controlled force to seal the interior of the vessel as long as the spring force is greater than the force of fluid pressure acting in the opposite direction upon the valve member.

When the pressure in the interior of the vessels exceeds a predetermined limit, the valve member is displaced from its seat to vent the interior of the vessel.

This system has the disadvantage that the valve member vibrates or impacts against its seat as soon as the pressure drops sharply as a result of venting. Furthermore, the valve never opens fully because the forces readily assume a balance between the spring and the fluid pressure force, particularly when the valve is cracked to permit partial release of pressure. As a result, the vented fluid, flowing at high velocity through the constriction provided between the valve member and the seat, rapidly erodes both the valve member and the seat.

As a result of the impact opening and closing of the valve member, the valve is noisy and requires frequent maintenance. The spring, which is located on the boiler itself, must be repeatedly adjusted at an inconvenient and dangerous location and frequently changes in its characteristics.

A solution to the problem has been proposed as will be apparent from my and the earlier patents referred to above. In this system, the safety valve is provided with a piston which is slidable in a cylinder while the cylinder is connected to a pressure-detecting system.

The pressure-detecting system can include one or more control valves and means for actuating the same to pressurize the cylinder of the safety-valve system or to vent the cylinder to the atmosphere, thereby allowing complete blockage of the valve or complete opening thereof in a uniform manner.

OBJECTS OF THE INVENTION

The principal object of the present invention is to provide a control system for a piston-operated safety valve which extends the principles of my earlier patents above and simplifies the construction of the control system.

Another object of this invention is to provide a pressure-detection and control system for a safety valve of the aforedescribed character with relatively simple and reliable means for actuating the control valves thereof.

Still another object of this invention is to provide an improved pressure-detection and control system for a safety valve which is free from the disadvantages of the prior system mentioned earlier but retains advantages of the system described in my aforementioned copending application and affords still greater improvements thereover.

Still another object of this invention is to provide a control system which enables the safety valve to operate reliably and efficiently with low noise, minimum maintenance and freedom from deterioration of the valve member and valve seat.

SUMMARY OF THE INVENTION

These objects and others which will become apparent hereinafter are attained, in accordance with the present invention, by a pressure-detection and control system which is similar to the system described in the aforementioned application except for the features discussed below.

According to one feature, the pressure detector comprises a single cylinder whose pressurizable chamber communicates with the pressure vessel to be protected and within which a control piston is slidable under the force of the fluid pressure in the latter chamber. According to the invention, moreover, the control piston acts upon a first control rod which is biased by elastic means, e.g. a spring of reset force, against the fluid displacement of the piston and which is connected to an actuating means having an element selectively engageable with the two control valves. The first of these control valves is selectively actuatable to enable communication between the main cylinder of the main piston of the safety valve and the pressure vessel while the second control valve is selectively actuatable to vent the main cylinder to the atmosphere.

According to the invention, each of these control valves is provided with a valve rod which is selectively actuatable mechanically by an element operatively connected to the control rod.

According to another feature of the invention, the control rod is biased against displacement by the control piston via a spring whose force is adjusted by a screw, the control rod bearing upon a second control rod, spring biased in the same direction, carrying an element such as a calibrating plate which can selectively engage the valve rods. The latter are advantageously aligned with one another and their respective control valves are received in first and second control chambers disposed symmetrically on opposite sides of a horizontal median plane.

BRIEF DESCRIPTION OF THE DRAWING

The above and other objects, features and advantages of the present invention will become more readily apparent from the following description, reference being made to the accompanying drawing in which:

FIGS. 2-5 are four sectional views in highly schematic form illustrating four phases of operation of the valve and control device of FIG. 1; and FIG. 6 is a graph illustrating the relationship between the pressure within the vessel provided with the safety valve for various phases of operation.

SPECIFIC DESCRIPTION

Figure 1:
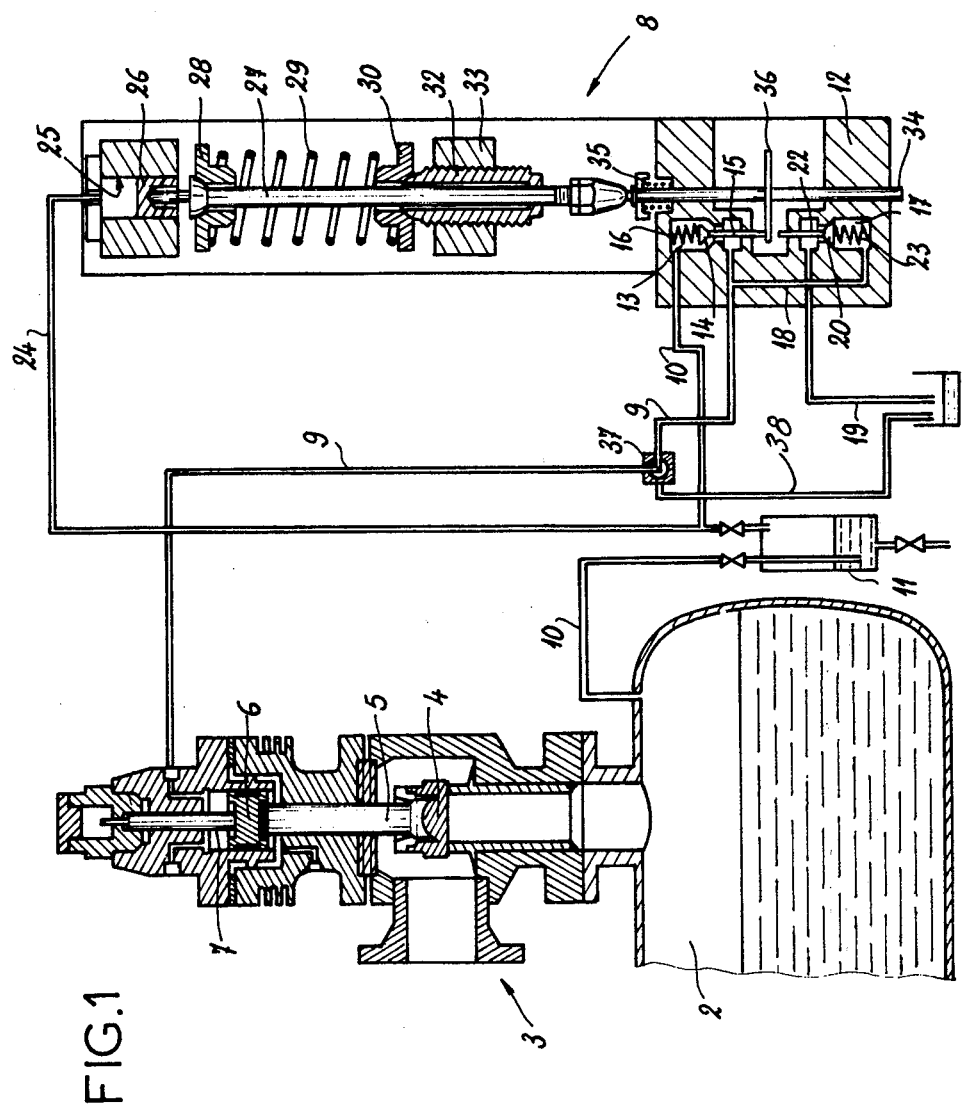
FIG. 1 is a diagrammatic cross-sectional view of a safety valve for a boiler provided with a control device according to the present invention.

FIG. 1 shows a boiler 2, i.e. the pressure vessel to be protected, which is provided with a safety valve 3. The latter comprises a valve member 4 mounted at the end of a control rod 5 of a piston 6 sliding in a cylinder 7.

The assembly or device represented at 8 serves to detect a pressure in the vessel 2 to control the valve 3 and includes a conduit 9 which is connected to the working chamber of cylinder 7 and a conduit 10 which is connected to the vessel 2 and communicates, in turn, with a relay or buffer reservoir 11 which is intended to prevent the liquid within the vessel 2 from traversing the device 8. The conduits 9 and 10 thus connect the pressure detector or sensor 8 with the valve 3 and the vessel 2.

The pressure-detecting control device 8 comprises, in turn, a first chamber 13 into which the conduits 9 and 10 open. This chamber 13 is thus adapted to be placed in communication with the interior of the vessel 2 and with the cylinder 7 of the valve 3. A first control valve 14 within the chamber 13 between the conduits 9 and 10 enables communication between them.

The first control valve 14 is mounted above an actuating rod or stem 15 on the side of conduit 9. The seat for the first valve 14 is located on the side thereof carrying the rod 15. The first control valve 14 is biased by a spring 16 which normally maintains the valve 14 upon its seat.

The first chamber 13 is formed in a body 12 which is also provided with a second chamber 17 communicating via a passage 18 with the conduit 9 and adapted to be vented to the atmosphere through a passage 19.

Communication between the passages 18 and 19 is interrupted via a valve 20 carrying a rod 22 coaxial with the rod 15 of the first control valve 14. The valve 20, therefore, is referred to herein as a second control valve.

The seat of the second control valve 20 is located on the side of the passage 19 and the rod or stem 22, the valve being biased by a spring 23 which normally maintains it against its seat to block communication between the passages 18 and 19.

In the embodiment illustrated in FIG. 1, constituting the bestmode embodiment of the present invention, the first and second chambers 13 and 17 and their respective valves are symmetrical about a horizontal median plane through the body 12.

A pipe 24 is tapped from the conduit 10 ahead of the relay reservoir 11 and opens into a chamber 25 of a control cylinder in which a control piston 26 is vertically displaceable. Thus the pressure in chamber 25 is the same as that in the vessel 2 and tends to displace the piston 26 downwardly.

A control rod 27 is associated with the piston 26 and is rigid with a collar 28 forming a seat for a helicoidal compression spring 29 which surrounds the rod 27 and bears, at its opposite end, against a collar 30 forming a spring seat which is traversed by the rod 27 and is positioned by a screw 32 received in a fixed support 33 of the control device 8. The fixed support 33 is thus rigid with the body 12 and is internally threaded so that the screw 32, also traversed by the rod 27, can be threaded upwardly or downwardly to alter the upward force applied by the spring 29 upon the collar 28, the rod 27 and the piston 26.

The free end of the rod 27, having the configuration of a pusher, bears upon the upper end of a second control rod 34 coaxial therewith traversing the body 12 while being guided for translation vertically in the latter. The rod 34 is provided with a spring 35 tending to urge it upwardly, i.e. toward the rod 27 of the piston 26.

An element 36, constituted, for example, by a calibration plate, projects transversely from the rod 34 to which it is fixed and is disposed between the juxtaposed but spaced-apart ends of the rods 15 and 22 of the first and second control valves 14 and 20, for cooperation with both of them.

A three-way valve 37 is provided, if desired, in the conduit 9 and between a vent tube and the valve 3 to permit the latter to operate selectively as a control valve or as a discharge valve.

In the position of the valve 37 shown in FIG. 1, the safety valve 3 acts as a control valve whose operation is entirely a function of the operation of the pressure detector 8. When, however, the chamber 7 is connected to the atmosphere via an outlet 38 in another position of the valve 37, the pressure in vessel 2 opens the valve member 4 and vents the interior of the vessel 2.

FIG. 6 is a diagram in which pressure is plotted along the abscissa while the open positions and closed positions of the valves 14 and 20 are indicated along the ordinate. The open positions are represented at O and the closed positions at F, respectively. The cycle of control valve 14 is represented in solid lines while that of the valve 20 is represented in broken lines.

While the pressure in the interior of the vessel 2 is less than the value P1, the force developed by the spring 29 is greater than the force exerted by the fluid in the vessel 2 upon the piston 26 so that the rod 27 is in its uppermost position and the spring 35 holds the rod 34 in its uppermost position against rod 27. The element 36 bears against the first valve rod 15 to open communication between the conduits 9 and 10, thus communicating the pressure of vessel 2 to the cylinder 7. This holds the valve 4 in its closed position.

The valve 20 is held closed by the spring 23 as shown in FIGS. 1 and 2.

When the pressure within the vessel 2 reaches the value P1, it produces, as shown in FIG. 3, because of the adjustment of the force of spring 29, a displacement of piston 26 and the control rod 27 downwardly. This urges the rod 34 and the element 36 downwardly against the action of spring 35.

The element 36 frees the rod 15 of valve 14 which closes under the action of spring 16. However, since element 36 has not yet engaged rod 22, valve 20 remains closed. Communication between the chamber or vessel 2 and the cylinder 7 is thus cut off although the pressure in chamber 7 is maintained as long as valve 20 remains closed.

When the pressure in the boiler 2 attains a higher value PT, piston 26 and the rod 27 are displaced further downwardly so that element 36 of the rod 34 acts upon the rod 22 of the second control valve 20 and vents the chamber 17 to the atmosphere. Cylinder 7 is thus brought to atmospheric pressure and, since the downward pressure upon the piston 6 has terminated, valve 4 rises because of the higher pressure in the boiler 2 as shown in FIG. 4.

When the pressure decreases to a value P2, the action of spring 29 is greater than the force exerted by the fluid on the piston 26, thereby displacing this piston upwardly. The valve 20 is freed and closes while the valve 14 remains in its closed position as shown in FIG. 5. Value P2 is lower than PT because the force of spring 23, acting through valve 20 and rod 22 upon plate 36 to supplement the upward thrust of spring 29, is no longer aided by the fluid pressure previously transmitted via conduit 9 to chamber 17.

As the pressure in the boiler 2 continues to drop and reaches a pressure PS lower than P1, the force of the fluid on the piston 26 (supplemented by the force of spring 16 and fluid pressure in chamber 13) is no longer sufficient to resist the upward action of the spring 29 which urges the rod 27 upwardly to relieve the downward force on rod 34, the latter being displaced upwardly by the spring 35 until the element 36 opens the valve 14. The resulting increase in pressure in the cylinder 7 drives the piston 4 against its seat and closes the pressure-regulating valve. The cycle is then ready for repetition.

The control device illustrated in the drawing and described above has the following important advantages:

The valve member 4 of the relief valve 3 is controlled to open and close at a reliable but noninstantaneous rate so that the valve member does not beat or impact against its seat and is practically free from wear.

The opening and closing of the relief valve are practically silent.

Loss of products from the boiler or other pressure vessel is minimized or eliminated completely.

The pressure-sensing device is able to function in a corrosive or electrically charged or high-pressure atmosphere without affecting the reliability.

The device is insensitive to counterpressure and requires no specific maintenance.

The pressure detector can be located at a distance from the pressure vessel which permits remote control and precludes danger to operating personnel.

Control of the device is simple and reliable, requiring only an adjustment of the pressure of spring 29.

The hysteresis effect due to the fluid pressure alternately acting on valves 14 and 20, resulting in the pressure differentials described above, stabilizes the operation of relief valve 3.

I claim:

1. A device for the detection and control of fluid pressure in a vessel provided with a venting port, comprising:
   a normally closed safety valve in said venting port provided with a valve member connected to a main piston, the latter being slidable in a main cylinder in response to pressure differentials between said vessel and said main cylinder;
   a first control chamber with opposite ends connected to said vessel and to said main cylinder;
   a first control valve in said first chamber having a first valve body reciprocable between an open position and a closed position for alternately unblocking and blocking communication between said vessel and said main cylinder;
   a second control chamber with opposite ends connected to the atmosphere and to said main cylinder;
   a second control valve in said second chamber having a second valve body reciprocable codirectionally with said first valve body between a closed position and an open position for alternately blocking and unblocking communication between said main cylinder and the atmosphere, said first and second valve bodies having stems aligned with each other in the direction of reciprocation;
   a first spring and a second spring respectively urging said first and second valve bodies into their closed positions;
   a control cylinder connected to said vessel for pressurization thereby;
   a control piston in said control cylinder provided with elastic biasing means tending to maintain same in a normal position, said control piston being shiftable into an alternate position via an intermediate position by fluid pressure from said vessel overcoming the force of said biasing means;
   a control rod operatively connected with said control piston and shiftable thereby along a line paralleling said direction of reciprocation; and
   a force-transmitting element on said control rod interposed between the stems of said first and second valve bodies for:
      (a) in said normal position of said control piston, keeping said first valve body in the open position thereof against the force of said first spring whereby fluid pressure from said vessel reaches said main cylinder and holds said valve member against a seat;
      (b) in said intermediate position of said control piston, allowing said first spring to move said first valve body into the closed position thereof while leaving said second valve body in its closed position whereby said venting port remains closed by said valve member;
      (c) in said alternate position of said control piston, holding said second valve body in the open position thereof against the force of said second spring whereby said main cylinder communicates with the atmosphere, enabling fluid pressure from said vessel to unseat said valve member whereby said fluid pressure is diminished by the opening of said venting port to progressively lower values allowing said control piston to return to said normal position by way of said intermediate position, said valve member remaining unseated until said normal position is restored.

2. The device defined in claim 1 wherein said first chamber is connected to said vessel through a relay reservoir.

3. A device as defined in claim 1 wherein the connection between said control piston and said control rod includes a further rod alignedly interposed therebetween, said biasing means comprising a coil spring bearing upon said further rod.

4. A device as defined in claim 3, further comprising an adjusting screw in contact with said coil spring for varying the stress thereof, said screw being threaded into a fixed support and being axially traversed together with said coil spring by said further rod.

5. A device as defined in claim 3 or 4, further comprising another spring bearing directly upon said control rod in aiding relationship with said coil spring.

* * * * *